(12) United States Patent
Wang et al.

(10) Patent No.: US 10,263,535 B2
(45) Date of Patent: Apr. 16, 2019

(54) METHOD AND DEVICE FOR VOLTAGE BALANCING OF DC BUS CAPACITORS OF NEUTRAL-POINT CLAMPED FOUR-LEVEL INVERTER

(71) Applicant: Tsinghua University, Beijing (CN)

(72) Inventors: Kui Wang, Beijing (CN); Zedong Zheng, Beijing (CN); Yongdong Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 15/980,794

(22) Filed: May 16, 2018

(65) Prior Publication Data
US 2019/0068080 A1    Feb. 28, 2019

(30) Foreign Application Priority Data
Aug. 28, 2017 (CN) .......................... 2017 1 0748127

(51) Int. Cl.
*H02M 7/487* (2007.01)
*H02M 7/5395* (2006.01)

(52) U.S. Cl.
CPC ......... *H02M 7/487* (2013.01); *H02M 7/5395* (2013.01)

(58) Field of Classification Search
CPC ......... H02M 7/483; H02M 2007/4835; H02M 7/487; H02M 7/527; H02M 7/5395

USPC ............................................ 363/95, 97, 131
See application file for complete search history.

(56) References Cited

U.S. PATENT DOCUMENTS

| 6,031,738 A * | 2/2000 | Lipo ..................... H02M 7/487 363/37 |
| 2008/0298103 A1* | 12/2008 | Bendre ................. H02M 7/487 363/89 |
| 2015/0280608 A1* | 10/2015 | Yoscovich ............ H02M 7/483 363/131 |
| 2015/0303826 A1* | 10/2015 | Arnedo ................. H02M 7/537 363/97 |
| 2017/0222574 A1* | 8/2017 | Lewis ............... H02M 7/53871 |

* cited by examiner

Primary Examiner — Alex Torres-Rivera
(74) Attorney, Agent, or Firm — Hodgson Russ LLP

(57) ABSTRACT

A method and a device for voltage balancing of DC bus capacitors of an NPC four-level inverter are disclosed. The method includes: determining an optimal zero-sequence voltage, determining an actual reference voltage of each phase based on the optimal zero-sequence voltage; comparing respectively three preset carrier signals with the actual reference voltage of each phase to obtain three first control signals; determining three duty-cycle adjustment values based on a voltage of the intermediate bus capacitor; adjusting correspondingly the three first control signals based the three duty-cycle adjustment values to obtain three second control signals; inputting correspondingly the three second control signals to three first switches of an upper bridge corresponding to each phase; and inputting correspondingly complementary signals of the three second control signals to three second switches of a lower bridge corresponding to each phase.

21 Claims, 8 Drawing Sheets

US 10,263,535 B2

METHOD AND DEVICE FOR VOLTAGE BALANCING OF DC BUS CAPACITORS OF NEUTRAL-POINT CLAMPED FOUR-LEVEL INVERTER

CROSS REFERENCE TO RELATED APPLICATION

This application is based upon and claims priority to Chinese Patent Application Serial No. 201710748127.5, filed with the State Intellectual Property Office of P. R. China on Aug. 28, 2017, the entire contents of which are incorporated herein by reference.

TECHNICAL FIELD

The present disclosure generally relates to the technical field of controlling multi-level converters, and more particularly, to a method for voltage balancing of DC (direct current) bus capacitors of a neutral-point clamped (NPC) four-level inverter and a device for voltage balancing of DC bus capacitors of an NPC four-level inverter.

BACKGROUND

An NPC multi-level converter has been widely applied in the industry due to its advantages such as simpler structure and fewer components. However, if the number of levels in the converter increases to four levels, it is difficult to balance voltages of bus capacitors in the converter.

SUMMARY

The NPC four-level inverter includes a direct current (DC) bus and at least three phase bridge arms. The DC bus includes an upper bus capacitor, an intermediate bus capacitor and a lower bus capacitor.

A method for voltage balancing of DC bus capacitors of the NPC four-level inverter, includes: determining an optimal zero-sequence voltage based on a voltage of the upper bus capacitor, a voltage of the lower bus capacitor and an initial reference voltage of each phase; determining an actual reference voltage of each phase based on the optimal zero-sequence voltage and the initial reference voltage of each phase; inputting three preset carrier signals for each phase; comparing respectively the three preset carrier signals with the actual reference voltage of each phase to obtain three first control signals for each phase; determining three duty-cycle adjustment values based on a voltage of the intermediate bus capacitor; adjusting correspondingly the three first control signals based the three duty-cycle adjustment values to obtain three second control signals for each phase; inputting correspondingly the three second control signals to three first switches of an upper bridge of a corresponding phase bridge arm; and inputting correspondingly complementary signals of the three second control signals to three second switches of a lower bridge of a corresponding phase bridge arm.

A device for voltage balancing of DC bus capacitors of an NPC four-level inverter, includes: a computing unit, configured to determine an optimal zero-sequence voltage based on a voltage of the upper bus capacitor, a voltage of the lower bus capacitor and an initial reference voltage of each phase, and to determine an actual reference voltage of each phase based on the optimal zero-sequence voltage for each phase and the initial reference voltage of each phase; a signal generation unit, configured to generate three preset carrier signals for each phase; a comparation unit, configured to compare respectively the three preset carrier signals with the actual reference voltage of each phase to obtain three first control signals for each phase; and a control unit, configured to determine three duty-cycle adjustment values based on a voltage of the intermediate bus capacitor, to adjust correspondingly the three first control signals based the three duty-cycle adjustment values to obtain three second control signals for each phase, to input correspondingly the three second control signals to three first switches of an upper bridge of a corresponding phase bridge arm, and to input correspondingly complementary signals of the three second control signals to three second switches of a lower bridge of a corresponding phase bridge arm.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
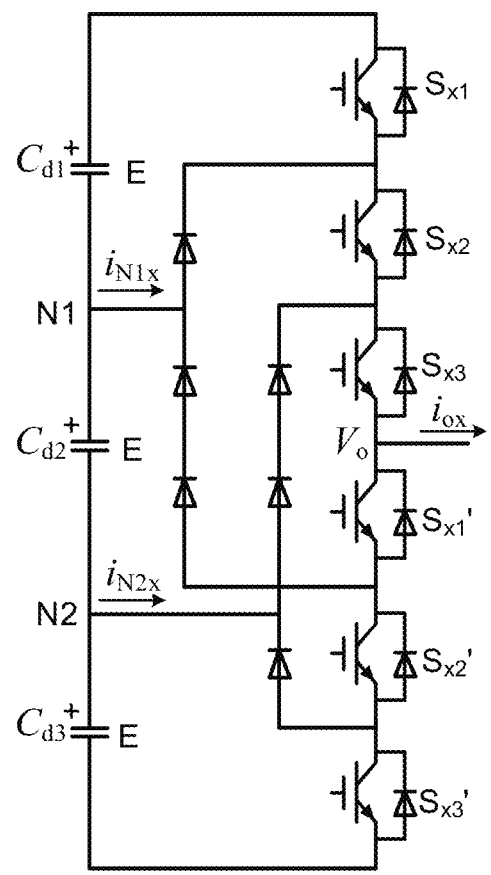
FIG. 1 is a schematic diagram illustrating one phase bridge arm of an NPC four-level inverter according to an embodiment of the present disclosure.

Reference will now be made in detail to exemplary embodiments, examples of which are illustrated in the accompanying drawings. The same or similar elements and elements having same or similar functions are denoted by like reference numerals throughout the descriptions. The embodiments described herein with reference to the accompanying drawings are explanatory and used to generally understand the present disclosure, which is not construed to limit the embodiments of the present disclosure.

Figure 2:
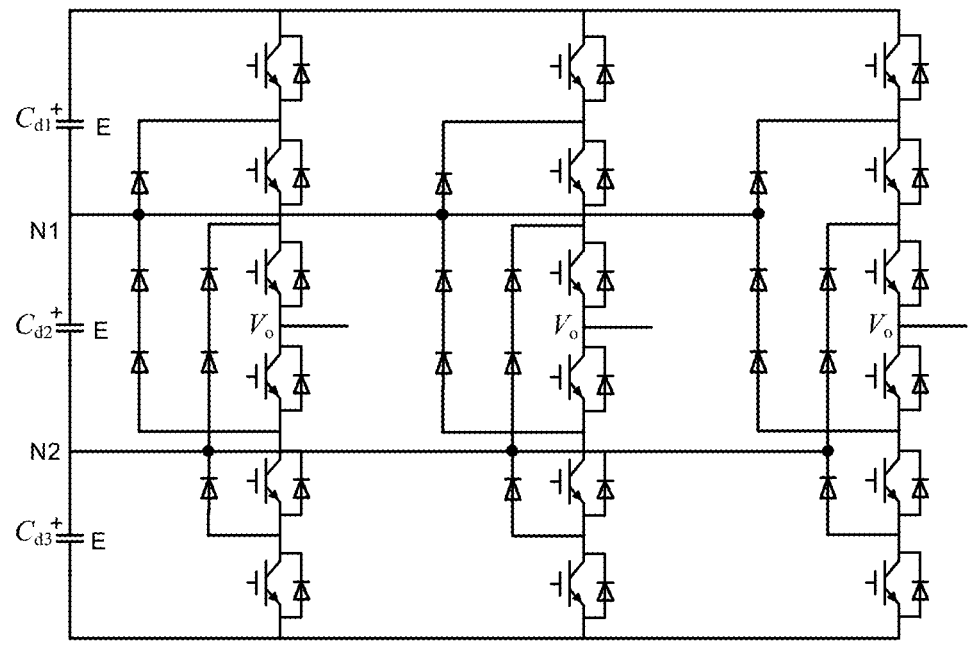
FIG. 2 is a schematic diagram illustrating three phase bridge arms of an NPC four-level inverter according to an embodiment of the present disclosure.

FIG. 1 is a schematic diagram illustrating one phase bridge arm of an NPC four-level inverter according to an embodiment of the present disclosure. As illustrated in FIG. 1, diodes are applied for clamping in the NPC four-level inverter. An input of the converter is a constant DC (direct current) voltage. The constant DC voltage are divided into three equal parts by three identical capacitors (such as capacitors $C_{d1}$, $C_{d2}$ and $C_{d3}$, i.e., an upper bus capacitor $C_{d1}$, an intermediate bus capacitor $C_{d2}$ and a lower bus capacitor $C_{d3}$). That is, the DC bus are divided into three equal parts. The one phase bridge arm includes an upper arm and a lower arm. The upper arm includes three first switches $S_{x1}$, $S_{x2}$ and $S_{x3}$. The lower arm includes three second switches $S_{x1}'$, $S_{x2}'$ and $S_{x3}'$. A control signal of the first switch and a control signal of the corresponding second switch are complementary to each other, for example, the control signal of the first switch $S_{x1}$ and the control signal of the corresponding second switch $S_{x1}'$ are complementary to each other. It should be understood that a structure of a plurality of phase bridge arms may be constructed according to the one phase bridge arm illustrated in FIG. 1. The plurality of phase bridge arms may be directly connected in parallel and share the DC bus capacitors to form a polyphase circuit. For example, FIG. 2 is a schematic diagram illustrating three phase bridge arms of an NPC four-level inverter according to an embodiment of the present disclosure. Those skilled in the art may also construct four-phase, five-phase, and six-equal structures, which are not limited in the embodiments of the present disclosure.

The difficulty in controlling the converter is how to balance the voltages of the three DC bus capacitors (i.e. the capacitors $C_{d1}$, $C_{d2}$ and $C_{d3}$).

First, a four-level carrier-overlap PWM (Pulse-Width Modulation) strategy is applied in the embodiments of the present disclosure for control.

Figure 3:
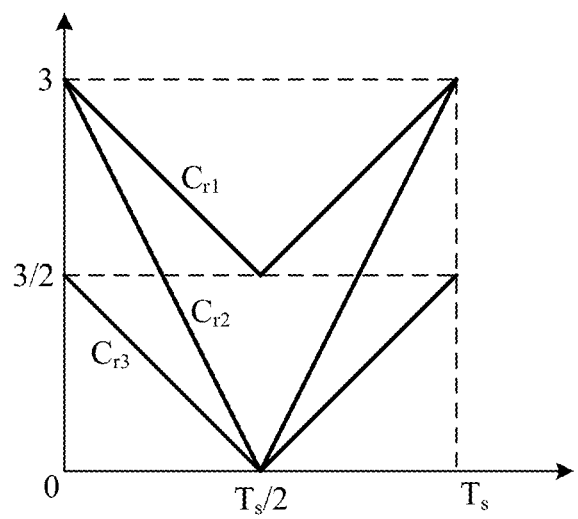
FIG. 3 is a schematic diagram illustrating three preset carrier signals according to an embodiment of the present disclosure.

FIG. 3 is a schematic diagram illustrating three preset carrier signals according to an embodiment of the present disclosure. As illustrated in FIG. 3, the four-level carrier-overlap PWM strategy is as follows. The three preset carrier signals $C_{r1}$, $C_{r2}$ and $C_{r3}$ and the three first switches $S_{x1}$, $S_{x2}$ and $S_{x3}$ have a one-by-one correspondence, where x represents three phase bridge arms a, b, c. The carrier signals $C_{r1}$, $C_{r2}$ and $C_{r3}$ are triangle-wave signals that have the same period and the same phase. The carrier signal $C_{r1}$ and the carrier signal $C_{r3}$ have an amplitude of 3/2. The carrier signal $C_{r2}$ has an amplitude of 3. The carrier signal $C_{r1}$ has a lowest point of 3/2 and a highest point of 3. The carrier signal $C_{r2}$ has a lowest point of 0 and a highest point of 3. The carrier signal $C_{r3}$ has a lowest point of 0 and a highest point of 3/2.

An output reference voltage of the phase bridge arm, i.e. a reference voltage of each phase is denoted as $u_{refx}$. When $0 \leq u_{refx} \leq 3$, the control signals of the switches $S_{x1}$, $S_{x2}$ and $S_{x3}$ may be obtained by comparing $u_{refx}$ with the carrier signals $C_{r1}$, $C_{r2}$ and $C_{r3}$ respectively. When $u_{refx}$ is greater than the amplitude of the carrier signal, the corresponding control signal is high level, otherwise the corresponding control signal is low level.

The DC bus of the NPC four-level inverter is connected in series by three identical capacitors. A rated voltage of each of the capacitors is E. The control signals of the three switches $S_{x1}$, $S_{x2}$ and $S_{x3}$ of the upper arm and the control signals of the three switches $S_{x1}'$, $S_{x2}'$ and $S_{x3}'$ of the lower arm are complementary correspondingly. When E is a voltage reference value and a negative bus is a potential zero, a relationship among states of the switches $S_{x1}$, $S_{x2}$ and $S_{x3}$ and an output voltage $V_{ox}$ is illustrated in Table 1.

TABLE 1 a relationship among states of $S_{x1}$, $S_{x2}$ and $S_{x3}$ and $V_{ox}$

| $S_{x1}$ | $S_{x2}$ | $S_{x3}$ | $V_{ox}$ |
|---|---|---|---|
| 0 | 0 | 0 | 0 |
| 0 | 0 | 1 | 1 |
| 0 | 1 | 1 | 2 |
| 1 | 1 | 1 | 3 |

According to Table 1, the switch $S_{x3}$ must be turned on before the switch $S_{x2}$ is turned on and the switch $S_{x2}$ must be turned on before the switch $S_{x1}$ is turned on. The output voltage $V_{ox}$ is a sum of the states of the switches $S_{x1}$, $S_{x2}$ and $S_{x3}$.

The four-level carrier-overlap PWM strategy of the present disclosure satisfies the switching principle that $S_{x3}$ precedes $S_{x2}$ conduction and $S_{x2}$ precedes $S_{x1}$ conduction.

Figure 4:
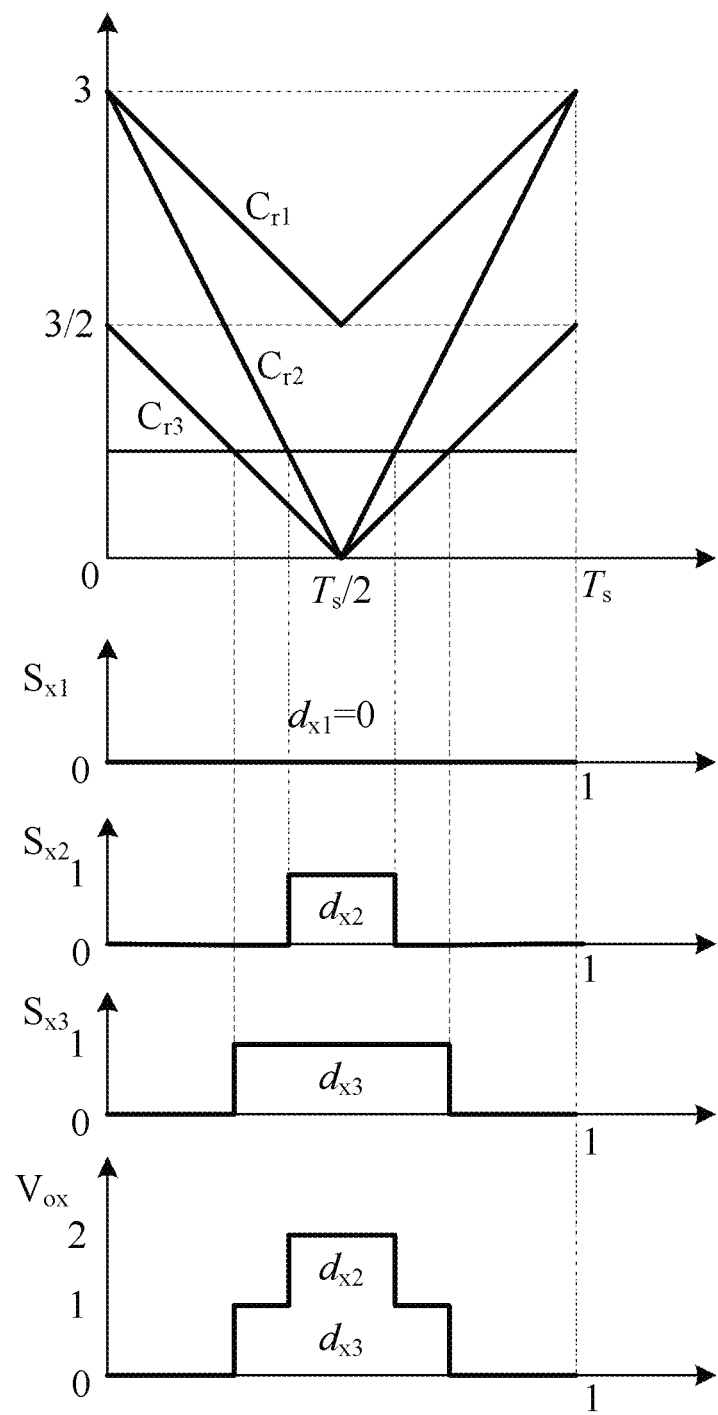
FIG. 4 is a schematic diagram illustrating signals of switching on/off switches and an output phase voltage when $0 \leq u_{refx} < 3/2$ according to an embodiment of the present disclosure.

As illustrated in FIG. 4, when $0 \leq u_{refx} < 3/2$, duty ratios of the control signals of the switches $S_{x1}$, $S_{x2}$ and $S_{x3}$ may be obtained as follows:

$$\begin{cases} d_{x1} = 0 \\ d_{x2} = \frac{1}{3} u_{refx} \\ d_{x3} = \frac{2}{3} u_{refx} \end{cases} \quad (1)$$

where, $d_{x1}$ represents a duty ratio of the control signal of $S_{x1}$, $d_{x2}$ represents a duty ratio of the control signal of $S_{x2}$, and $d_{x3}$ represents a duty ratio of the control signal of $S_{x3}$.

Figure 5:
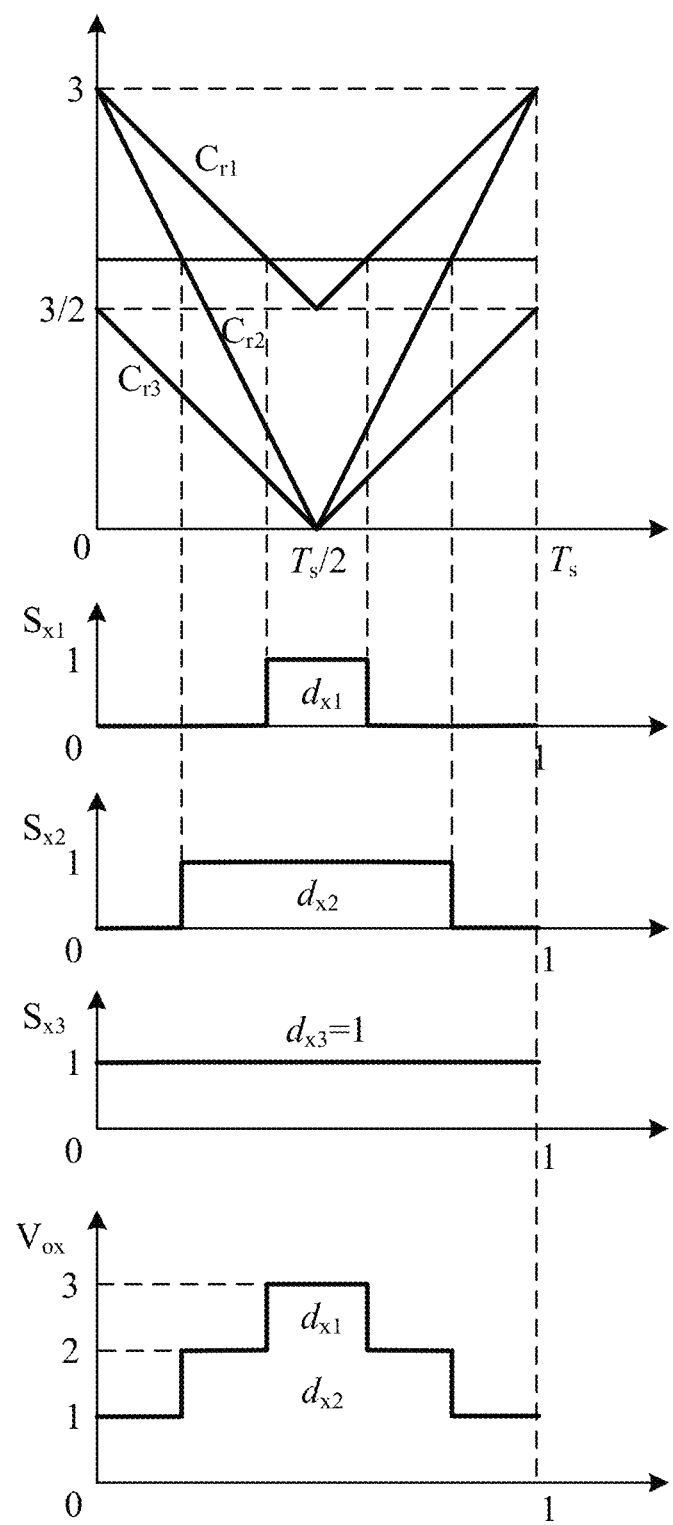
FIG. 5 is a schematic diagram illustrating signals of switching on/off switches and an output phase voltage when $3/2 \leq u_{refx} \leq 3$ according to an embodiment of the present disclosure.

As illustrated in FIG. 5, when $3/2 \leq u_{refx} \leq 3$, duty ratios of the control signals of the switches $S_{x1}$, $S_{x2}$ and $S_{x3}$ may be obtained as follows:

$$\begin{cases} d_{x1} = \frac{2}{3}\left(u_{refx} - \frac{3}{2}\right) \\ d_{x2} = \frac{1}{3} u_{refx} \\ d_{x3} = 1 \end{cases} \quad (2)$$

Based on formulas (1) and (2), the output voltage during one carrier period has an average value $u_{ox}$. $u_{ox}$ is denoted by a formula of $$u_{ox} = d_{x1} + d_{x2} + d_{x3} = u_{refx} \quad (3).$$

Based on formula (3), regardless of the range of the reference voltage $u_{refx}$, the average value $u_{ox}$ of the output voltage is equal to the reference voltage $u_{refx}$, which proves the correctness of the modulation strategy in the present disclosure.

Figure 6:
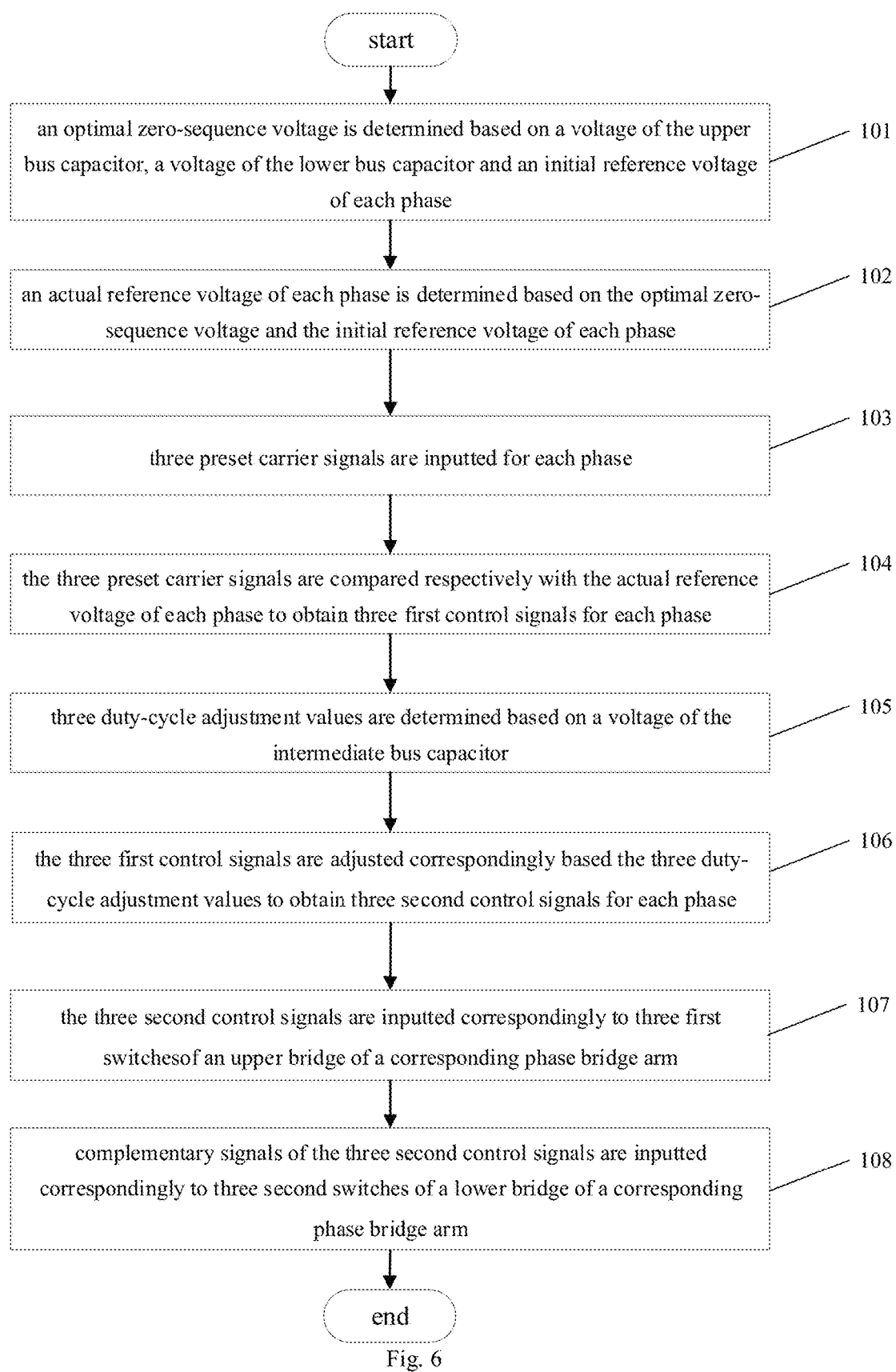
FIG. 6 is a flow chart of a method for voltage balancing of DC bus capacitors of an NPC four-level inverter according to an embodiment of the present disclosure.

FIG. 6 is a flow chart of a method for voltage balancing of DC bus capacitors of an NPC four-level inverter according to an embodiment of the present disclosure. As illustrated in FIG. 6, the method includes acts in the following blocks.

At block 101, an optimal zero-sequence voltage is determined based on a voltage of the upper bus capacitor, a voltage of the lower bus capacitor and an initial reference voltage of each phase.

At block 102, an actual reference voltage of each phase is determined based on the optimal zero-sequence voltage and the initial reference voltage of each phase.

At block 103, three preset carrier signals are inputted for each phase.

At block 104, the three preset carrier signals are compared respectively with the actual reference voltage of each phase to obtain three first control signals for each phase.

At block 105, three duty-cycle adjustment values are determined based on a voltage of the intermediate bus capacitor.

At block 106, the three first control signals are adjusted correspondingly based the three duty-cycle adjustment values to obtain three second control signals for each phase.

At block 107, the three second control signals are inputted correspondingly to three first switches of an upper bridge of a corresponding phase bridge arm.

At block 108, complementary signals of the three second control signals are inputted correspondingly to three second switches of a lower bridge of a corresponding phase bridge arm.

for the acts at block 101, when the output level is 2, the load current flows through the bus neutral point N1. When the output level is 1, the load current flows through the bus neutral point N2. Therefore, the output current of the bus neutral point N1 and the output current of the bus neutral point N2 during one carrier period are denoted by a formula of:

$$\begin{cases} i_{N1x} = (d_{x2} - d_{x1}) \cdot i_{ox} \\ i_{N2x} = (d_{x3} - d_{x2}) \cdot i_{ox} \end{cases} \quad (4)$$

where, $i_{ox}$ represents an output current corresponding to x phase, $i_{N1x}$ represents a current that flows through the neutral point N1 for x phase, i.e., a bus neutral point current for the neutral point N1 or the output current of the bus neutral point N1, and $i_{N2x}$ represents a current that flows through the neutral point N2 for x phase i.e., a bus neutral point current for the neutral point N2 or the output current of the bus neutral point N2.

For one carrier period, effects of the bus neutral point currents on the voltages of the three bus capacitors is denoted by formulas of:

$$\Delta u_{d1x} = \frac{2}{3} \cdot \frac{i_{N1x} \cdot T_s}{C_d} + \frac{1}{3} \cdot \frac{i_{N2x} \cdot T_s}{C_d} \quad (5)$$

$$\Delta u_{d2x} = \frac{1}{3} \cdot \frac{i_{N2x} \cdot T_s}{C_d} - \frac{1}{3} \cdot \frac{i_{N1x} \cdot T_s}{C_d} = \quad (6)$$

$$\frac{1}{3} \cdot \frac{(i_{N2x} - i_{N1x}) \cdot T_s}{C_d} = \frac{1}{3} \cdot \frac{(d_{x1} + d_{x3} - 2d_{x2}) \cdot i_{ox} \cdot T_s}{C_d}, \text{ and}$$

$$\Delta u_{d3x} = -\frac{1}{3} \cdot \frac{i_{N1x} \cdot T_s}{C_d} - \frac{2}{3} \cdot \frac{i_{N2x} \cdot T_s}{C_d}, \quad (7)$$

where, $\Delta u_{d1x}$ represents a voltage increasing value of the bus capacitor $C_{r1}$, $\Delta u_{d2x}$ represents a voltage increasing value of the bus capacitor $C_{r2}$, $\Delta u_{d3x}$ represents a voltage increasing value of the bus capacitor $C_{r3}$, T represents the carrier period, and $C_d$ represents a capacitance value of a single bus capacitor.

Since a total voltage of the DC bus is equal to the inputted DC power supply voltage that is constant, the voltages of the three bus capacitors may be balanced by controlling the currents flowing through the neutral points N1 and N2. For the upper bus capacitor and the lower bus capacitor, based on formulas (5) and (7), effects of the currents flowing through the neutral points N1 and N2 on a voltage difference of the upper bus capacitor and the lower bus capacitor may be denoted by a formula of:

$$\Delta u_{Nx} = \Delta u_{d3x} - \Delta u_{d1x} = -\frac{(i_{N1x} + i_{N2x}) \cdot T_s}{C_d}, \quad (8)$$

where, $\Delta u_{Nx}$ represents the voltage difference between the voltage of the upper bus capacitor and the voltage of the lower bus capacitor.

Based on formula (8), the difference between the voltage of the upper bus capacitor and the voltage of the lower bus capacitor is determined by a sum of the currents flowing through the neutral points N1 and N2. The sum of the currents flowing through the neutral points N1 and N2 is denoted by a formula of:

$$i_{Nx} = i_{N1x} + i_{N2x} = (d_{x3} - d_{x1}) \cdot i_{ox} \quad (9),$$

where, $i_{Nx}$ represents the total neutral-point current, i.e., the sum.

The formulas (1) and (2) respectively, are brought into formula (9) to obtain the following formulas:

$$\text{when } 0 \leq u_{refx} < 3/2, i_{Nx} = (d_{x3} - d_{x1}) \cdot i_{ox} = \frac{2}{3} u_{refx} \cdot i_{ox}, \quad (10)$$

$$\text{when } 3/2 \leq u_{refx} \leq 3, i_{Nx} = (d_{x3} - d_{x1}) \cdot i_{ox} = \left(2 - \frac{2}{3} u_{refx}\right) \cdot i_{ox}. \quad (11)$$

Based on formulas (10) and (11), $i_{Nx}$ is a piecewise function on $u_{refx}$. For a three-phase system, a sum $i_N$ of the three phase neutral currents is denoted by a formula of $$i_N = i_{Na} + i_{Nb} + i_{Nc} \quad (12).$$

To adjust the total neutral-point current $i_N$, a zero-sequence voltage injection method may be used. If the injected zero-sequence voltage is $u_z$, the actual reference voltage is denoted by a formula of $$u_{refx}' = u_{refx} + u_z \quad (13).$$

Based on formulas (10) and (11), the zero-sequence voltage injection changes the value of the reference voltage, which in turn may change the magnitude of the total neutral-point current. Because the total neutral-point current and the zero-sequence voltage have a complex piecewise function relationship, it is difficult to obtain an analytical expression of the optimal zero-sequence voltage directly. To consider complexity and control effect and further to reduce switching losses, the zero-sequence voltage that makes the reference voltage for one phase 0, 1.5, or 3 is selected as the key zero-sequence voltage. At this point, the switch for this phase does not act or only one pair of switches operate. For example, if the reference voltage of one phase is 0 or 3, all switches for this phase does not act, and if the reference voltage of one phase is 1.5, switches $S_{x2}$ and $S_{x2}'$ operate.

Therefore, the method of balancing the voltages of the upper bus capacitor and the lower bus capacitor may be as follows.

At act 1011, all key zero-sequence voltages are calculated based on the initial reference voltages of all phases.

If the at least three phase bridge arms includes three phase bridge arms, the three phase initial reference voltages $u_{refa}$, $u_{refb}$ and $u_{refc}$ are ranked from big to small as $u_{max}$, $u_{mid}$ and $u_{min}$, in which $u_{refa}$ represents a-phase initial reference voltage, $u_{refb}$ represents b-phase initial reference voltage and $u_{refc}$ represents c-phase initial reference voltage.

When $u_{mid}-u_{min}>1.5$, 2 key zero-sequence voltages $-u_{min}$ and $3-u_{max}$ are determined.

When $u_{mid}-u_{min}<1.5$ and $u_{max}-u_{min}>1.5$, 3 key zero-sequence voltages $-u_{min}$, $1.5-u_{mid}$ and $3-u_{max}$ are determined.

When $u_{max}-u_{min}<1.5$, 5 key zero-sequence voltages $-u_{min}$, $1.5-u_{max}$, $1.5-u_{mid}$, $1.5-u_{min}$ and $3-u_{max}$ are determined.

At act 1012, a bus neutral-point current corresponding to each key zero-sequence voltage is calculated based on currents of all phases.

In detail, an actual reference voltage of each phase after each key zero-sequence voltage is introduced is calculated by a formula of $$u_{refx}' = u_{refx} + u_z,$$

where $u_{refx}'$ represents the actual reference voltage of each phase, $u_{refx}$ represents the initial reference voltage of each phase, x represents a phase, b phase or c phase, and $u_z$ represents the key zero-sequence voltage.

A neutral-point current corresponding to each phase is calculated based on the actual reference voltage of each phase, in which when $0 \leq u_{refx}' < 3/2$, $$i_{Nx} = \frac{2}{3} u_{refx}' \cdot i_{ox},$$

where $i_{Nx}$ represents the neutral-point current corresponding to each phase, and $i_{ox}$ represents an output current corresponding to each phase; when $3/2 \leq u_{refx}' \leq 3$, $$i_{Nx} = \left(2 - \frac{2}{3} u_{refx}'\right) \cdot i_{ox}.$$

A sum of the three neutral-point currents corresponding to the three phases are calculated as the bus neutral-point current corresponding to each key zero-sequence voltage by a formula of $$i_N = \sum_{x=a,b,c} i_{Nx} = i_{Na} + i_{Nb} + i_{Nc}.$$

At act 1013, a target neutral-point current is calculated based on a difference between the voltage of the upper bus capacitor and the voltage of the lower bus capacitor.

In detail, the difference between the voltage of the upper bus capacitor and the voltage of the lower bus capacitor is calculated by a formula of $$\Delta u_N = u_{d3} - u_{d1},$$

where, $\Delta u_N$ represents the difference, $u_{d1}$ represents the voltage of the upper bus capacitor and $u_{d3}$ represents the voltage of the lower bus capacitor.

The target neutral-point current is calculated based on the difference by a formula of $$i_{Nref} = \frac{\Delta u_N \cdot C_d}{T_s},$$

where, $i_{Nref}$ represents the target neutral-point current, $T_s$ represents a carrier period, and $C_d$ represents a capacitance value of a single bus capacitor.

At act 1014, the bus neutral-point current corresponding to each key zero-sequence voltage is compared with the target neutral-point current.

At act 1015, a key zero-sequence voltage that minimizes the difference between the target neutral-point current and the bus neutral-point current is selected as the optimal zero-sequence voltage.

In addition, according to embodiments of the present disclosure, the duty cycle of the control signal of each switch may be adjusted to balance the voltage of the intermediate bus capacitor. Therefore, the voltages of the three bus capacitors may be balanced completely.

The three duty-cycle adjustment values are determined based on the voltage of the intermediate bus capacitor as follows.

An adjustment direction of a duty ratio of each of the three first control signals is determined based on a magnitude relationship between the voltage of the intermediate bus capacitor and a given voltage and based on a polarity of a load current.

The three duty-cycle adjustment values are calculated by applying a PI control or a hysteresis control algorithm.

A final duty cycle of each of the three first control signals is obtained based on the direction and the corresponding duty-cycle adjustment value.

It can be seen from formula (6) that change on the voltage of the intermediate bus capacitor is determined by the difference between $i_{N1x}$ and $i_{N2x}$. Formulas (1) and (2) can be introduced into formula (4). Then it can be seen that $i_{N1x}=i_{N2x}$ regardless of the reference voltage, which indicates that the average charging and discharging current of the intermediate bus capacitor under the modulation strategy of the present disclosure is zero, under ideal conditions. The self-balancing of the voltage of the intermediate bus capacitor can be achieved.

To realize the dynamic balance control under the non-ideal condition of the voltage of the intermediate bus capacitor, the width of $d_{x1}$, $d_{x2}$ and $d_{x3}$ can be fine-tuned according to formula (4). The specific method is as follows.

when $u_{d2}>E$ and $i_{ox}>0$, or when $u_{d2}<E$ and $i_{ox}<0$, $d_{x1}+d_{x3}-2d_{x2}$ may be decreased, in which when $0 \leq u_{refx}'<3/2$, $d_{x1}$ is equal to 0, $d_{x2}$ is needed to increase and $d_{x3}$ is needed to decrease, and when $3/2 \leq u_{refx}' \leq 3$, $d_{x3}$ is equal to 1, $d_{x2}$ is needed to increase and $d_{x1}$ is needed to decrease, where $u_{d2}$ represents the voltage of the intermediate bus capacitor, $d_{x1}$, $d_{x2}$ and $d_{x3}$ represent duty ratios of the three first control signals, E represents a rated voltage of each of the bus capacitors, and $i_{ox}$ represents an output current corresponding to each phase;

when $u_{d2}>E$ and $i_{ox}<0$, or when $u_{d2}<E$ and $i_{ox}>0$, $d_{x1}+d_{x3}-2d_{x2}$ may be increased, in which when $0 \leq u_{refx}'<3/2$, $d_{x1}$ is equal to 0, $d_{x2}$ is needed to decrease and $d_{x3}$ is needed to increase, and when $3/2 \leq u_{refx}' \leq 3$, $d_{x3}$ is equal to 1, $d_{x2}$ is needed to decrease and $d_{x1}$ is needed to increase.

To not affect harmonic performance of the output voltage, the width of fine-tuning $d_{x1}$, $d_{x2}$, and $d_{x3}$ is generally limited to 10% or less, which can be calculated through precise calculations or PI control, or hysteresis control algorithm.

In summary, the method for voltage balancing of DC bus capacitors of an NPC four-level inverter provided in the present disclosure is completely independent of the load power factor, and the voltage balance control of the bus capacitors can be achieved at any modulation ratio and power factor.

To verify the correctness of the modulation strategy and the voltage balance control of the bus capacitors provided in the present disclosure, a three-phase four-level NPC inverter is built and verified by simulation. The simulation parameters are: DC bus voltage of 4500V, bus single-capacitor capacity of $C_d$=1000 μF, carrier frequency of 2 kHz, modulation ratio of 1.0, load power factor of 0.99, and current RMS (Root Mean Square) of 200 A.

Figure 7:
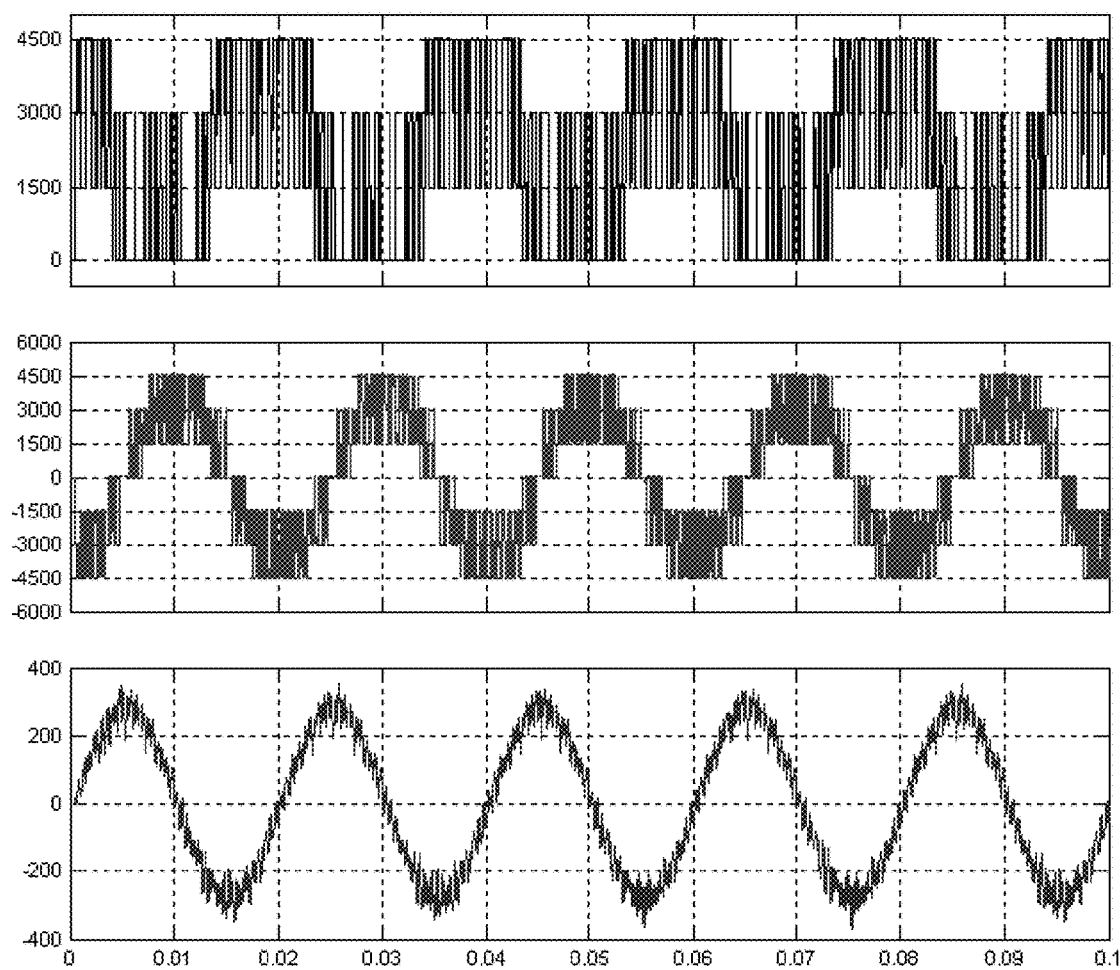
FIG. 7 is a schematic diagram illustrating simulation waveforms of phase voltages, line voltages and phase currents by using a method for balancing voltages of bus capacitors of an NPC four-level inverter according to an embodiment of the present disclosure.
Figure 8:
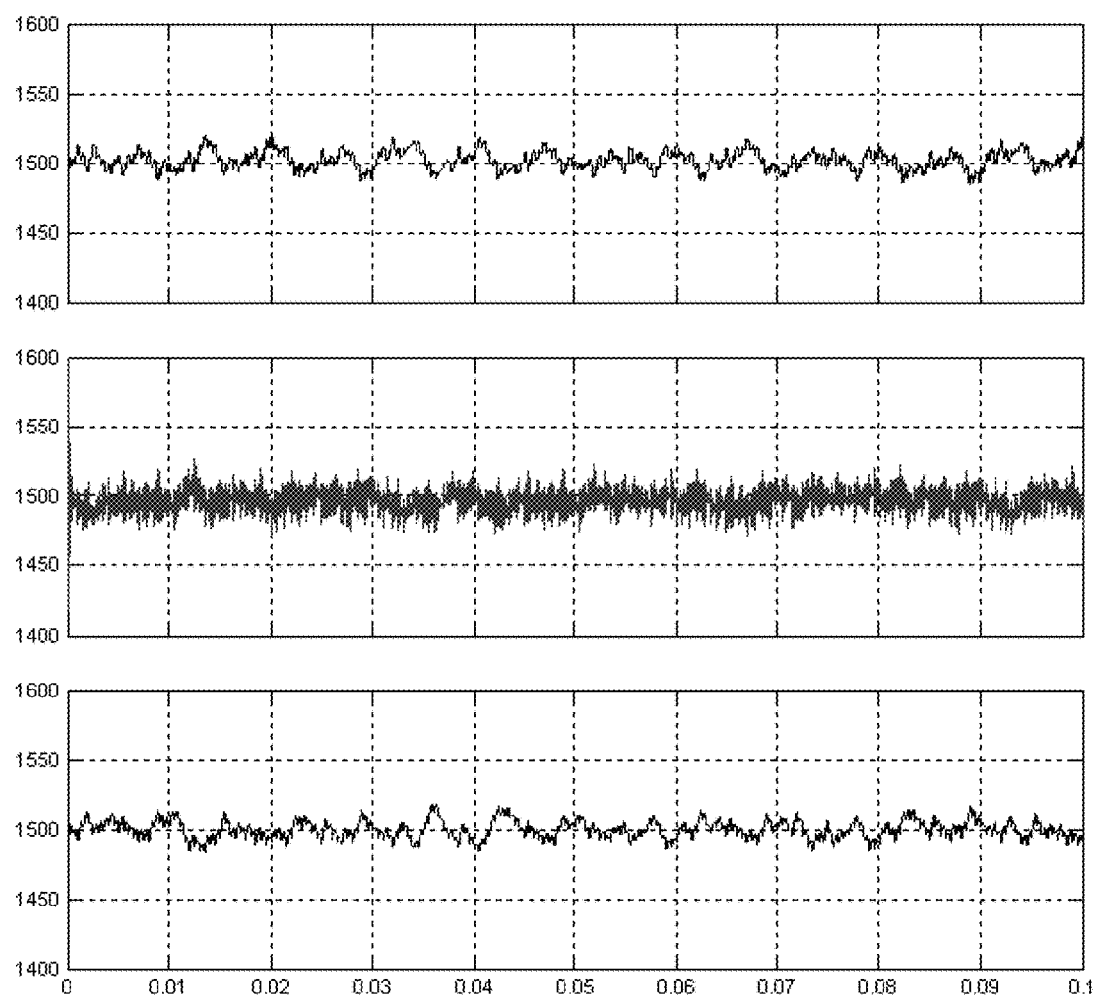
FIG. 8 is a schematic diagram illustrating simulation waveforms of a voltage of an upper bus capacitor, a voltage of an intermediate bus capacitor and a voltage of a lower bus capacitor by using a method for balancing voltages of bus capacitors of an NPC four-level inverter according to an embodiment of the present disclosure.

FIG. 7 is a schematic diagram illustrating simulation waveforms of phase voltages, line voltages and phase currents by using a method for balancing voltages of bus capacitors of an NPC four-level inverter according to an embodiment of the present disclosure. The Phase voltage has four levels, the line voltage has seven levels, and the current waveform is a good sine wave. FIG. 7 is a schematic diagram illustrating simulation waveforms of a voltage of an upper bus capacitor, a voltage of an intermediate bus capacitor and a voltage of a lower bus capacitor by using a method for balancing voltages of bus capacitors of an NPC four-level inverter according to an embodiment of the present disclosure. The three voltages of the bus capacitors are balanced, which proves the correctness and effectiveness of the modulation strategy and voltage balancing control method.

The modulation strategy and voltage balancing control method provided in the present disclosure are applicable to a variety of NPC four-level topologies such as diode clamping and active neutral point clamping, which have similar implementation and control effects.

Figure 9:
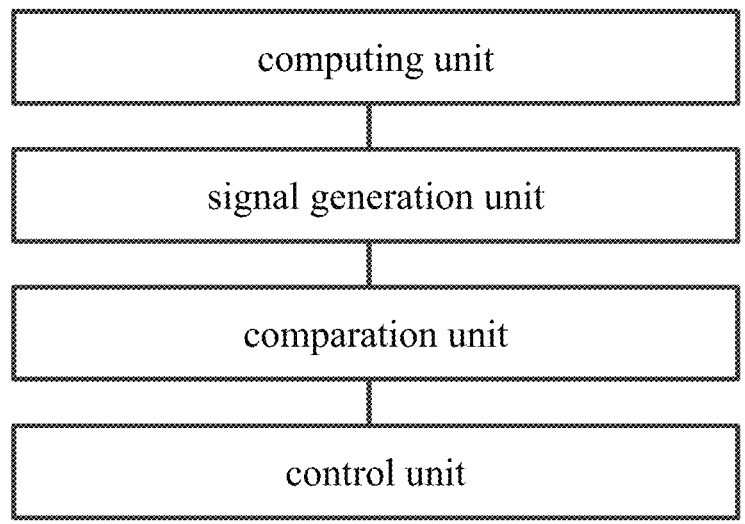
FIG. 9 is a block diagram illustrating a device for voltage balancing of DC bus capacitors of an NPC four-level inverter according to an embodiment of the present disclosure.

To achieve the above embodiment, the present disclosure also proposes a device for voltage balancing of DC bus capacitors of an NPC four-level inverter, as shown in FIG. 9, wherein the NPC four-level inverter comprises an upper bus capacitor, an intermediate bus capacitor and a lower bus capacitor.

The device includes: a computing unit, configured to determine an optimal zero-sequence voltage based on a voltage of the upper bus capacitor, a voltage of the lower bus capacitor and an initial reference voltage of each phase, and to determine an actual reference voltage of each phase based on the optimal zero-sequence voltage for each phase and the initial reference voltage of each phase; a signal generation unit, configured to generate three preset carrier signals for each phase; a comparison unit, configured to compare respectively the three preset carrier signals with the actual reference voltage of each phase to obtain three first control signals for each phase; and a control unit, configured to determine three duty-cycle adjustment values based on a voltage of the intermediate bus capacitor, to adjust correspondingly the three first control signals based the three duty-cycle adjustment values to obtain three second control signals for each phase, to input correspondingly the three second control signals to three first switches of an upper bridge of a corresponding phase bridge arm, and to input correspondingly complementary signals of the three second control signals to three second switches of a lower bridge of a corresponding phase bridge arm.

The above technical solution adopted by the present disclosure has the following advantages.

1. it is easy to implement because it adopts a carrier-overlap PWM modulation strategy.

2. the voltage balance control of the DC bus capacitors are divided into two decoupled control targets, and different methods are used to achieve the balance control of the voltage of the intermediate bus capacitor and the balance control of the voltages of the upper and lower bus capacitors, which simplifies the voltage balance control algorithm of the bus capacitors and is easy to implement and reduce the system size and cost.

3. The carrier-overlap PWM modulation strategy provided by the present disclosure has the characteristics that the intermediate bus capacitor has an average charge-discharge current of zero. Under non-ideal conditions, the voltage of the intermediate bus capacitor can be realized only by fine-tuning the duty cycle of the control signal by a simple method.

4. The present disclosure adopts a method based on the zero-sequence voltage injection to achieve the balance control of voltages of the upper and lower bus capacitor. The control algorithm is simple, the calculation amount is small, and there is no complicated mathematical operation process.

In the description, it is to be understood that, terms such as "first" and "second" are used herein for purposes of description and are not intended to indicate or imply relative importance or significance. In the description of the present disclosure, it is to be illustrated that, unless specified or limited otherwise, terms "interconnected," and "connected," are understood broadly, such as fixed, detached or integral interconnections and connections, also can be mechanical or electrical interconnections and connections, further can be direct interconnections and connections and indirect interconnections and connections via intermediate medium. For those skilled in the art, it can be understood the concrete meaning of the terms mentioned above in the present disclosure according to specific circumstances. Furthermore, in the description of the present disclosure, unless illustrated otherwise, "a plurality of" means two or more than two.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. These and other aspects should be understood by those skilled in the art with reference to the following description and drawings. In these description and drawings, some particular implementations of the present disclosure are disclosed to present some ways for implementing the principle of the present disclosure. However, it should be understood that embodiments of the present disclosure is not limited to this. Contrarily, embodiments of the present disclosure include all the variations, modifications and equivalents within the spirit and scope of the appended claims.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium. The storage medium mentioned above may be read-only memories, magnetic disks or CD, etc.

In the description, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the above terms in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for voltage balancing of direct current (DC) bus capacitors of a neutral-point clamped (NPC) four-level inverter, wherein the NPC four-level inverter comprises a DC bus and at least three phase bridge arms, the DC bus comprises an upper bus capacitor, an intermediate bus capacitor and a lower bus capacitor, and the method comprises:

determining an optimal zero-sequence voltage based on a voltage of the upper bus capacitor, a voltage of the lower bus capacitor and an initial reference voltage of each phase;

determining an actual reference voltage of each phase based on the optimal zero-sequence voltage and the initial reference voltage of each phase;

inputting three preset carrier signals for each phase;

comparing respectively the three preset carrier signals with the actual reference voltage of each phase to obtain three first control signals for each phase;

determining three duty-cycle adjustment values based on a voltage of the intermediate bus capacitor;

adjusting correspondingly the three first control signals based the three duty-cycle adjustment values to obtain three second control signals for each phase;

inputting correspondingly the three second control signals to three first switches of an upper bridge of a corresponding phase bridge arm; and inputting correspondingly complementary signals of the three second control signals to three second switches of a lower bridge of a corresponding phase bridge arm.

2. The method according to claim 1, wherein determining the optimal zero-sequence voltage based on the voltage of the upper bus capacitor, the voltage of the lower bus capacitor and the initial reference voltage of each phase, comprises:

calculating all key zero-sequence voltages based on the initial reference voltages of all phases;

calculating a bus neutral-point current corresponding to each key zero-sequence voltage based on currents of all phases;

calculating a target neutral-point current based on a difference between the voltage of the upper bus capacitor and the voltage of the lower bus capacitor;

comparing the bus neutral-point current corresponding to each key zero-sequence voltage with the target neutral-point current; and selecting a key zero-sequence voltage that minimizes the difference between the target neutral-point current and the bus neutral-point current as the optimal zero-sequence voltage.

3. The method according to claim 2, wherein the at least three phase bridge arms comprise three phase bridge arms, calculating all key zero-sequence voltages based on the initial reference voltages of all phases comprises:

ranking the three initial reference voltages $u_{refa}$, $u_{refb}$ and $u_{refc}$ from big to small as $u_{max}$, $u_{mid}$ and $u_{min}$, wherein $u_{refa}$ represents an initial reference voltage of a phase, $u_{refb}$ represents an initial reference voltage of b phase and $u_{refc}$ represents an initial reference voltage of c phase;

when $u_{mid} - u_{min} > 1.5$, determining 2 key zero-sequence voltages $-u_{in}$ and $3 - u_{max}$;

when $u_{mid}-u_{min}<1.5$ and $u_{max}-u_{min}>1.5$, determining 3 key zero-sequence voltages $-u_{min}$, $1.5-u_{mid}$ and $3-u_{max}$;

when $u_{max}-u_{min}<1.5$, determining 5 key zero-sequence voltages $-u_{min}$, $1.5-u_{max}$, $1.5-u_{mid}$, $1.5-u_{min}$ and $3-u_{max}$.

4. The method according to claim 2, wherein calculating the bus neutral-point current corresponding to each key zero-sequence voltage based on three phase currents comprises:

calculating the actual reference voltage of each phase after each key zero-sequence voltage is introduced by a formula of $$u_{refx}'=u_{refx}+u_z,$$

where $u_{refx}'$ represents the actual reference voltage of each phase, $u_{refx}$ represents the initial reference voltage of each phase, x represents a phase, b phase or c phase, and $u_z$ represents the key zero-sequence voltage;

calculating a neutral-point current corresponding to each phase based on the actual reference voltage of each phase, wherein when $0 \le u_{refx}' < 3/2$, $$i_{Nx} = \frac{2}{3} u_{refx}' \cdot i_{ox},$$

where $i_{Nx}$ represents the neutral-point current corresponding to each phase, and $i_{ox}$ represents an output current corresponding to each phase, when $3/2 \le u_{refx}' \le 3$, $$i_{Nx} = \left(2 - \frac{2}{3} u_{refx}'\right) \cdot i_{ox};$$

calculating a sum of the three neutral-point currents corresponding to the three phases as the bus neutral-point current corresponding to each key zero-sequence voltage.

5. The method according to claim 2, wherein calculating the target neutral-point current based on the difference between the voltage of the upper bus capacitor and the voltage of the lower bus capacitor comprises:

calculating the difference between the voltage of the upper bus capacitor and the voltage of the lower bus capacitor by a formula of $$\Delta u_N = u_{d3} - u_{d1},$$

where, $\Delta u_N$ represents the difference, $u_{d1}$ represents the voltage of the upper bus capacitor and $u_{d3}$ represents the voltage of the lower bus capacitor; and calculating the target neutral-point current based on the difference by a formula of $$i_{Nref} = \frac{\Delta u_N \cdot C_d}{T_s},$$

where, $i_{Nref}$ represents the target neutral-point current, $T_s$ represents a carrier period, and $C_d$ represents a capacitance value of each of the upper bus capacitor, the intermediate bus capacitor, and the lower bus capacitor.

6. The method according to claim 1, wherein determining the actual reference voltage of each phase based on the optimal zero-sequence voltage and the initial reference voltage of each phase comprises:

summing the optimal zero-sequence voltage with the initial reference voltage of each phase.

7. The method according to claim 1, wherein the three preset carrier signals $C_{r1}$, $C_{r2}$ and $C_{r3}$ corresponds to the three first switches $S_{x1}$, $S_{x2}$ and $S_{x3}$, x represents a phase, b phase or c phase; the preset carrier signals $C_{r1}$, $C_{r2}$ and $C_{r3}$ are triangle-wave signals that have the same period and the same phase, a first carrier signal $C_{r1}$ and a third carrier signal $C_{r3}$ have an amplitude of 3/2, a second carrier signal $C_{r2}$ has an amplitude of 3;

the first carrier signal $C_{r1}$ has a lowest point of 3/2 and a highest point of 3;

the second carrier signal $C_{r2}$ has a lowest point of 0 and a highest point of 3; and the third carrier signal $C_{r3}$ has a lowest point of 0 and a highest point of 3/2.

8. The method according to claim 7, wherein comparing respectively the three preset carrier signals with the actual reference voltage of each phase to obtain the three first control signals for each phase, comprises:

when $0 \le u_{refx}' \le 3$, where $u_{refx}'$ represents the actual reference voltage of each phase, comparing $u_{refx}'$ with the three preset carrier signals $C_{r1}$, $C_{r2}$ and $C_{r3}$ respectively to obtain the three first control signals, in which, when the actual reference voltage of each phase is greater than the amplitude of the first carrier signal, the corresponding first control signal is high level, and when the actual reference voltage of each phase is less than or equal to the amplitude of the first carrier signal, the corresponding first control signal is low level;

when the actual reference voltage of each phase is greater than the amplitude of the second carrier signal, the corresponding first control signal is high level, and when the actual reference voltage of each phase is less than or equal to the amplitude of the second carrier signal, the corresponding first control signal is low level;

when the actual reference voltage of each phase is greater than the amplitude of the third carrier signal, the corresponding first control signal is high level, and when the actual reference voltage of each phase is less than or equal to the amplitude of the third carrier signal, the corresponding first control signal is low level.

9. The method according to claim 1, wherein determining the three duty-cycle adjustment values based on the voltage of the intermediate bus capacitor comprises:

determining an adjustment direction of a duty ratio of each of the three first control signals based on a magnitude relationship between the voltage of the intermediate bus capacitor and a given voltage and based on a polarity of a load current;

calculating the three duty-cycle adjustment values by applying a PI control or a hysteresis control algorithm; and obtaining a final duty cycle of each of the three first control signals based on the direction and the corresponding duty-cycle adjustment value.

10. The method according to claim 9, wherein determining the adjustment direction of the duty ratio of each of the three first control signals based on the magnitude relationship between the voltage of the intermediate bus capacitor and the given voltage and based on the polarity of the load current, comprises:

when $u_{d2}>E$ and $i_{ox}>0$, or when $u_{d2}<E$ and $i_{ox}<0$, decreasing $d_{x1}+d_{x3}-2d_{x2}$, in which when $0 \le u_{refx}'<3/2$, $d_{x1}$ is equal to 0, $d_{x2}$ is needed to increase and $d_{x3}$ is needed to decrease, and when $3/2 \le u_{refx}' \le 3$, $d_{x3}$ is equal to 1, $d_{x2}$ is needed to increase and $d_{x1}$ is needed to decrease, where $u_{d2}$ represents the voltage of the intermediate bus capacitor, $d_{x1}$, $d_{x2}$ and $d_{x3}$ represent duty ratios of the three first control signals, E represents a rated voltage of each of the bus capacitors, and $i_{ox}$ represents an output current corresponding to each phase;

when $u_{d2}>E$ and $i_{ox}<0$, or when $u_{d2}<E$ and $i_{ox}>0$, increasing $d_{x1}+d_{x3}-2d_{x2}$, in which when $0 \le u_{refx}'<3/2$, $d_{x1}$ is equal to 0, $d_{x2}$ is needed to decrease and $d_{x3}$ is needed to increase, and when $3/2 \le u_{refx}' \le 3$, $d_{x3}$ is equal to 1, $d_{x2}$ is needed to decrease and $d_{x1}$ is needed to increase.

11. The method according to claim 9, wherein a width of the duty-cycle adjustment value is within 10%.

12. A device for voltage balancing of direct current (DC) bus capacitors of a neutral-point clamped (NPC) four-level inverter, wherein the NPC four-level inverter comprises a DC bus and at least three phase bridge arms, the DC bus comprises an upper bus capacitor, an intermediate bus capacitor and a lower bus capacitor, and the device comprises:
   a computing unit, configured to determine an optimal zero-sequence voltage based on a voltage of the upper bus capacitor, a voltage of the lower bus capacitor and an initial reference voltage of each phase, and to determine an actual reference voltage of each phase based on the optimal zero-sequence voltage and the initial reference voltage of each phase;
   a signal generation unit, configured to generate three preset carrier signals for each phase;
   a comparation unit, configured to compare respectively the three preset carrier signals with the actual reference voltage of each phase to obtain three first control signals for each phase; and
   a control unit, configured to determine three duty-cycle adjustment values based on a voltage of the intermediate bus capacitor, to adjust correspondingly the three first control signals based the three duty-cycle adjustment values to obtain three second control signals for each phase, to input correspondingly the three second control signals to three first switches of an upper bridge of a corresponding phase bridge arm, and to input correspondingly complementary signals of the three second control signals to three second switches of a lower bridge of a corresponding phase bridge arm.

13. The device according to claim 12, wherein the computing unit is configured to determine the optimal zero-sequence voltage based on the voltage of the upper bus capacitor, the voltage of the lower bus capacitor and the initial reference voltage of each phase, by acts of:
   calculating all key zero-sequence voltages based on the initial reference voltages of all phases;
   calculating a bus neutral-point current corresponding to each key zero-sequence voltage based on currents of all phases;
   calculating a target neutral-point current based on a difference between the voltage of the upper bus capacitor and the voltage of the lower bus capacitor;
   comparing the bus neutral-point current corresponding to each key zero-sequence voltage with the target neutral-point current; and
   selecting a key zero-sequence voltage that minimizes the difference between the target neutral-point current and the bus neutral-point current as the optimal zero-sequence voltage.

14. The device according to claim 13, wherein the at least three phase bridge arms comprise three phase bridge arms, the computing unit is configured to calculate all key zero-sequence voltages based on the initial reference voltages of all phases by acts of:
   ranking the three phase initial reference voltages $u_{refa}$, $u_{refb}$ and $u_{refc}$ from big to small as $u_{max}$, $u_{mid}$ and $u_{min}$, wherein $u_{refa}$ represents an initial reference voltage of a phase, $u_{refb}$ represents an initial reference voltage of b phase and $u_{refc}$ represents an initial reference voltage of c phase;
   when $u_{mid}-u_{min}>1.5$, determining 2 key zero-sequence voltages $-u_{min}$ and $3-u_{max}$;
   when $u_{mid}-u_{min}<1.5$ and $u_{max}-u_{min}>1.5$, determining 3 key zero-sequence voltages $-u_{min}$, $1.5-u_{mid}$ and $3-u_{max}$;
   when $u_{max}-u_{min}<1.5$, determining 5 key zero-sequence voltages $-u_{min}$, $1.5-u_{max}$, $1.5-u_{mid}$, $1.5-u_{min}$ and $3-u_{max}$.

15. The device according to claim 13, wherein the computing unit is configured to calculate the bus neutral-point current corresponding to each key zero-sequence voltage based on three phase currents comprises:
   calculating the actual reference voltage of each phase after each key zero-sequence voltage is introduced by a formula of $u_{refx}'=u_{refx}+u_z,$ where $u_{refx}'$ represents the actual reference voltage of each phase, $u_{refx}$ represents the initial reference voltage of each phase, x represents a phase, b phase or c phase, and $u_z$ represents the key zero-sequence voltage;
   calculating a neutral-point current corresponding to each phase based on the actual reference voltage of each phase, wherein
   when $0 \le u_{refx}'<3/2$, $$i_{Nx} = \frac{2}{3}u_{refx}' \cdot i_{ox},$$

where $i_{Nx}$ represents the neutral-point current corresponding to each phase, and $i_{ox}$ represents an output current corresponding to each phase,
   when $3/2 \le u_{refx}' \le 3$, $$i_{Nx} = \left(2 - \frac{2}{3}u_{refx}'\right) \cdot i_{ox};$$

calculating a sum of the three neutral-point currents corresponding to the three phases as the bus neutral-point current corresponding to each key zero-sequence voltage.

16. The device according to claim 12, wherein the computing unit is configured to calculate the target neutral-point current based on the difference between the voltage of the upper bus capacitor and the voltage of the lower bus capacitor by acts of:
   calculating the difference between the voltage of the upper bus capacitor and the voltage of the lower bus capacitor by a formula of $\Delta u_N = u_{d3} - u_{d1},$ where, $\Delta u_N$ represents the difference, $u_{d1}$ represents the voltage of the upper bus capacitor and $u_{d3}$ represents the voltage of the lower bus capacitor; and calculating the target neutral-point current based on the difference by a formula of $$i_{Nref} = \frac{\Delta u_N \cdot C_d}{T_s},$$

where, $i_{Nref}$ represents the target neutral-point current, $T_s$ represents a carrier period, and $C_d$ represents a capacitance value of each of the upper bus capacitor, the intermediate bus capacitor, and the lower bus capacitor.

17. The device according to claim 12, wherein the computing unit is configured to determine the actual reference voltage of each phase based on the optimal zero-sequence voltage and the initial reference voltage of each phase by an act of:
summing the optimal zero-sequence voltage with the initial reference voltage of each phase.

18. The device according to claim 12, wherein the control is configured to determine the three duty-cycle adjustment values based on the voltage of the intermediate bus capacitor by acts of:
determining an adjustment direction of a duty ratio of each of the three first control signals based on a magnitude relationship between the voltage of the intermediate bus capacitor and a given voltage and based on a polarity of a load current;
calculating the three duty-cycle adjustment values by applying a PI control or a hysteresis control algorithm; and
obtaining a final duty cycle of each of the three first control signals based on the direction and the corresponding duty-cycle adjustment value.

19. The device according to claim 18, wherein the control is configured to determine the adjustment direction of the duty ratio of each of the three first control signals based on the magnitude relationship between the voltage of the intermediate bus capacitor and the given voltage and based on the polarity of the load current, by acts of:
when $u_{d2}>E$ and $i_{ox}>0$, or when $u_{d2}<E$ and $i_{ox}<0$, decreasing $d_{x1}+d_{x3}-2d_{x2}$, in which when $0 \le u_{refx}'<3/2$, $d_{x1}$ is equal to 0, $d_{x2}$ is needed to increase and $d_{x3}$ is needed to decrease, and when $3/2 \le u_{refx}' \le 3$, $d_{x3}$ is equal to 1, $d_{x2}$ is needed to increase and $d_{x1}$ is needed to decrease, where $u_{d2}$ represents the voltage of the intermediate bus capacitor, $d_{x1}$, $d_{x2}$ and $d_{x3}$ represent duty ratios of the three first control signals, E represents a rated voltage of each of the bus capacitors, and $i_{ox}$ represents an output current corresponding to each phase;
when $u_{d2}>E$ and $i_{ox}<0$, or when $u_{d2}<E$ and $i_{ox}>0$, increasing $d_{x1}+d_{x3}-2d_{x2}$, in which when $0 \le u_{refx}'<3/2$, do is equal to 0, $d_{x2}$ is needed to decrease and $d_{x3}$ is needed to increase, and when $3/2 \le u_{refx}' \le 3$, $d_{x3}$ is equal to 1, $d_{x2}$ is needed to decrease and do is needed to increase.

20. The device according to claim 17, wherein when the actual reference voltage of each phase is greater than the amplitude of the first carrier signal, the corresponding first control signal is high level, and when the actual reference voltage of each phase is less than or equal to the amplitude of the first carrier signal, the corresponding first control signal is low level;
when the actual reference voltage of each phase is greater than the amplitude of the second carrier signal, the corresponding first control signal is high level, and when the actual reference voltage of each phase is less than or equal to the amplitude of the second carrier signal, the corresponding first control signal is low level;
when the actual reference voltage of each phase is greater than the amplitude of the third carrier signal, the corresponding first control signal is high level, and when the actual reference voltage of each phase is less than or equal to the amplitude of the third carrier signal, the corresponding first control signal is low level.

21. The device according to claim 12, wherein the three preset carrier signals $C_{r1}$, $C_{r2}$ and $C_{r3}$ corresponds to the three first switches $S_{x1}$, $S_{x2}$ and $S_{x3}$, x represents a phase, b phase or c phase; the preset carrier signals $C_{r1}$, $C_{r2}$ and $C_{r3}$ are triangle-wave signals that have the same period and the same phase,
a first carrier signal Cu and a third carrier signal $C_{r3}$ have an amplitude of 3/2, a second carrier signal $C_{r2}$ has an amplitude of 3;
the first carrier signal $C_{r1}$ has a lowest point of 3/2 and a highest point of 3;
the second carrier signal $C_{r2}$ has a lowest point of 0 and a highest point of 3; and
the third carrier signal $C_{r3}$ has a lowest point of 0 and a highest point of 3/2.

* * * * *